United States Patent Office
3,440,281
Patented Apr. 22, 1969

3,440,281
PROCESS FOR PREPARING HALOBENZO-
PHENONEIMINES
Rodney Ian Fryer, North Caldwell, and Leo Henryk
Sternbach, Upper Montclair, N.J., assignors to Hoffmann-La Roche Inc., Nutley, N.J., a corporation of
New Jersey
No Drawing. Filed Dec. 9, 1965, Ser. No. 512,815
Int. Cl. C07c 85/08
U.S. Cl. 260—566          3 Claims

ABSTRACT OF THE DISCLOSURE

Halobenzophenoneimines are prepared by treating halobenzophenones with ammonia under pressure in the presence of zinc chloride. The halobenzophenoneimines are intermediates useful in the preparation of pharmacologically active 1,4-benzodiazepines.

---

The present invention relates to novel chemical processes. More particularly, the present invention relates to novel chemical processes useful in preparing 2-aminobenzophenoneimines, compounds which can readily be converted into therapeutically useful 1,4-benzodiazepines.

The novel process aspect of the present invention involves treating a compound of the formula

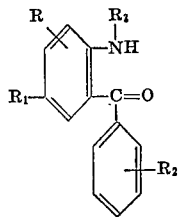

I wherein R and $R_1$ are selected from the group consisting of hydrogen, halogen, nitro, trifluoromethyl and lower alkyl, $R_2$ is selected from the group consisting of hydrogen and halogen and $R_3$ is selected from the group consisting of hydrogen, lower alkyl, $C_3$–$C_6$ cycloalkyl and $C_3$–$C_6$ cycloalkyl-lower alkyl, with ammonia whereby to prepare the aforementioned 2-amino-benzophenoneimines of the formula

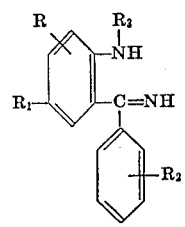

II wherein R, $R_1$, $R_2$ and $R_3$ are as above. Particularly advantageous results are obtained when the above reaction is effected under pressure.

The term "halogen" as used throughout the instant specification is intended to connote all four forms thereof; namely, fluorine, bromine, iodine and chlorine, unless otherwise specified. The term "lower alkyl" as used herein represents a straight or branched chain hydrocarbon group such as methyl, ethyl, isopropyl, butyl and the like. The expression "$C_3$–$C_6$ cycloalkyl" designates a group such as cyclopentyl, cyclohexyl, preferentially, cyclopropyl and the like. The phrase "$C_3$–$C_6$ cycloalkyl-lower alkyl" covers a group such as cyclopentyl-methyl, cyclopropyl-ethyl, advantageously, cyclopropyl-methyl and the like.

In a preferred embodiment, $R_1$ in Formulae I and II above is either halogen (advantageously, chlorine) or nitro. In a still more preferred embodiment, $R_1$ in Formulae I and II above is halogen (advantageously, chlorine) and R and $R_2$ are both hydrogen. Most preferred are compounds conforming to the latter structural configuration wherein $R_3$ is lower alkyl.

The treatment of a compound of Formula I above with ammonia is preferably effected in the presence of any suitable inert organic solvent such as lower alkanols, e.g. methanol, ethanol and the like.

However, in a less advantageous aspect, the said treatment can be effected without employing a solvent medium.

In a particularly useful process aspect of the present invention, a lower alkanol, preferentially, methanol, is utilized as the medium in which the conversion of compounds of Formula I to compounds of Formula II is conducted.

It has been found that the highest yields of compounds of the Formula II above are obtained if a catalyst is present during the condensation of compounds of Formula I above with ammonia. Preferred catalysts are those which have been defined as aprotic Lewis acids. Aprotic Lewis acids are non-proton containing molecules which are capable of accepting electron pairs (electron-deficient molecules). Aprotic Lewis acids are sometimes referred to in the art as substances which are suitable for use as catalysts in the Friedel and Crafts reaction. Representative of aprotic Lewis acids useable for the purposes of the present invention are borontrifluoride, titanium tetrachloride, aluminum chloride, ferric chloride, zinc chloride, antimony trichloride, tin tetrachloride and the like. Especially preferred for the purposes of the present invention is zinc chloride. The amount of Lewis acid utilized is not critical. However, it should be present in sufficient quantities to effect the preparation of the imine of Formula II above in good yields.

As is evident from the above, pressure is not a critical feature of the herein described process, but the process is preferably conducted under pressure to provide for efficient utilization of gaseous ammonia. Any suitable pressure that will effect the desired conversion of the ketone of the Formula I above to the corresponding imine of Formula II above is included within the purview of the present invention. Furthermore, while a successful performance of the process disclosed herein does not require conducting the condensation within a specific temperature range, it is preferred to effect the preparation of the imine of Formula II above at elevated temperatures.

Compounds of Formula II above are useful in view of unexpected capability of being facilely converted into 1,4-benzodiazepin-2-ones, compounds of known therapeutic usefulness. For example, compounds of the formula

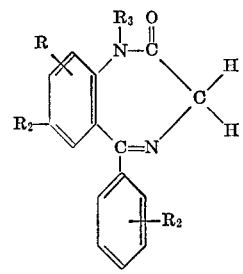

III wherein R, $R_1$ and $R_2$ are as above and $R_3$ is lower alkyl and cycloalkyl, can be prepared from the corresponding compound of Formula II above by the reaction of the latter with a compound of the formula

X—CO—CH$_2$—Y          IV wherein X and Y are each selected from the group consisting of chlorine, bromine and iodine, in the presence of a base such as an alkali metal hydroxide, for example, sodium hydroxide. X and Y in Formula IV above may each represent the same or different halogen atoms. Thus, encompassed by the genus of Formula IV above are such compounds as chloroacetyl bromide, bromoacetyl bromide and the like.

The foregoing is a description of a new and novel process for the preparation of 2-aminobenzophenoneimines, compounds useful in the preparation of medicinally valuable 1,4-benzodiazepin-2-ones. It will be readily apparent to one skilled in the art that variations in these procedures are possible.

The following examples are illustrative but not limitative of the present invention. All temperatures stated are in degrees centigrade.

Example 1

A mixture of 100 g. of 2-amino-5-chlorobenzophenone, 200 ml. of methanol, 200 ml. of ammonia and 2 g. of zinc chloride was placed in an autoclave which was then charged with an overpressure of 15 atmos. of nitrogen. The reaction mixture was heated at 150° for 15 hrs. and evaporated in vacuo to remove the solvent. The residue remaining was dissolved in dichloromethane, washed with dilute ammonia, dried and evaporated. The residue was dissolved in a small amount of benzene and chromatographed over 800 g. of silica gel. Benzene was used as the eluent until 500 ml. fractions gave less than 1 g. of material on evaporation. The eluent was changed to a 5% ether, benzene mixture and when 4 l. had been collected was changed again to 100% ether. The ether eluent upon evaporation gave 2-amino - 5 - chlorobenzophenoneimine as pale yellow prisms melting at 73–74°.

Example 2

A mixture of 100 g. of 2-amino-5-nitrobenzenophenone, 200 ml. of methanol, 200 ml. of ammonia and 2 g. of zinc chloride was placed in an autoclave which was then charged with an overpressure of 15 atmos. of nitrogen. The reaction mixture was heated at 160° for 12 hrs. The reaction mixture was cooled and filtered leaving yellow crystals. The so-obtained yellow crystals were suspended in 650 ml. of 1 N hydrochloric acid and 300 g. of ice was added. The resulting mixture was filtered. The filtrate was made basic at 5° with ammonium hydroxide and then extracted with 3×100 ml. of dichloromethane. The extracts were combined, washed, dried and concentrated. Recrystallization from a mixture of benzene and petroleum ether (30–60°) gave 2-amino-5-nitrobenzophenoneimine as yellow prisms, metling at 152–154°.

Example 3

A mixture of 97 g. of 5-chloro-2-methylaminobenzophenone, 200 ml. of ammonia, 2 g. of zinc chloride and 200 ml. of methanol was placed in an autoclave which was then charged with an over-pressure of 15 atmos. of nitrogen and heated for 24 hrs. at 145°. The resulting solution was then evaporated. The residue was taken up in 300 ml. of dichloromethane and the resultant medium was washed, dried and evaporated. Recrystallization of the residue from methanol gave 2-methylamino-5-chlorobenzophenoneimine as yellow prisms, melting at 95–97°.

Example 4

A solution of 5 g. (20.7 mmole) of 5-chloro-2-methylaminobenzophenone imine in 50 ml. of benzene was cooled in an ice bath and treated first with 50 ml. of 0.5 N sodium hydroxide and then with a solution of 4.6 g. (22.7 mmole) of bromoacetyl bromide in 10 ml. of benzene. After stirring the mixture vigorously for 15 min., 23 ml. of 1 N sodium hydroxide was added thereto. Stirring was continued for an additional 2 hrs. The layers which formed were separated and the organic layer was washed, dried, concentrated and then chromatographed over 100 g. of silica with benzene. When no further ketone was isolated still utilizing benzene as the eluent, the eluent was changed to ether and gave, on evaporation, 7-chloro-2,3-dihydro-1-methyl-5-phenyl - 2H - 1,4 - benzodiazepin-2-one as white prisms. Recrystallization from ether gave the product which was found to have a melting point of 128–130°.

In the same manner, 2,3-dihydro-1-methyl-7-nitro-5-phenyl-2H-1,4-benzodiazepin-2-one can be prepared from 2-methylamino-5-nitrobenzophenoneimine.

We claim:
1. A process for the preparation of a compound of the formula

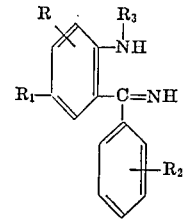

I wherein R is selected from the group consisting of hydrogen, halogen, lower alkyl, nitro and trifluoromethyl; $R_1$ is halogen; $R_2$ is selected from the group consisting of hydrogen and halogen and $R_3$ is selected from the group consisting of hydrogen, lower alkyl, $C_3$–$C_6$ cycloalkyl and $C_3$–$C_6$ cycloalkyl-lower alkyl which comprises reacting a compound of the formula

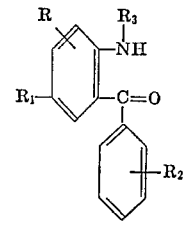

wherein R, $R_1$, $R_2$ and $R_3$ are as above with ammonia in the presence of zinc chloride and under pressure.

2. The process of claim 1 wherein R and $R_2$ are both hydrogen.

3. The process of claim 1 wherein $R_1$ is chlorine and $R_3$ is methyl.

References Cited

UNITED STATES PATENTS

| | | | |
|---|---|---|---|
| 2,422,013 | 6/1947 | Haury et al. | 260—566 |
| 2,513,996 | 7/1950 | Haury | 260—566 |
| 2,692,283 | 10/1954 | Haury | 260—566 |
| 2,870,206 | 1/1959 | Meyer et al. | 260—566 |
| 3,267,110 | 8/1966 | Pachter et al. | 260—566 XR |

OTHER REFERENCES

Strain, "Journal American Chemical Society," vol. 53, pages 820–823 (1930).

ROBERT V. HINES, *Primary Examiner.*

U.S. Cl. X.R.

260—239.3, 562, 570, 999